(12) United States Patent
Morisaki (10) Patent No.: US 9,399,978 B2
(45) Date of Patent: Jul. 26, 2016

(54) HYBRID VEHICLE AND METHOD FOR CONTROLLING THE SAME

(75) Inventor: Keisuke Morisaki, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 2 days.

(21) Appl. No.: 13/980,456

(22) PCT Filed: Jan. 20, 2011

(86) PCT No.: PCT/JP2011/050928
§ 371 (c)(1),
(2), (4) Date: Jul. 18, 2013

(87) PCT Pub. No.: WO2012/098658
PCT Pub. Date: Jul. 26, 2012

(65) Prior Publication Data
US 2013/0297193 A1  Nov. 7, 2013

(51) Int. Cl.
*F02N 11/08* (2006.01)
*B60K 6/445* (2007.10)
*B60W 10/26* (2006.01)
*B60W 20/00* (2016.01)
*B60W 30/18* (2012.01)

(52) U.S. Cl.
CPC ............ *F02N 11/0833* (2013.01); *B60K 6/445* (2013.01); *B60W 10/26* (2013.01); *B60W 20/00* (2013.01); *B60W 30/18054* (2013.01); *F02N 11/084* (2013.01); *F02N 11/0814* (2013.01); *F02N 11/0818* (2013.01); *B60W 20/40* (2013.01); *B60W 2510/244* (2013.01); *B60W 2520/04* (2013.01); *B60W 2710/244* (2013.01); *F02N 11/0862* (2013.01); *Y02T 10/6239* (2013.01); *Y10S 903/903* (2013.01)

(58) Field of Classification Search
CPC ............ F02N 11/0803; F02N 11/0814; F02N 11/0818; F02N 11/0825; F02N 11/0833; F02N 11/0862; F02N 11/04; F02N 2200/046; F02N 2200/061; F02N 2200/0801
USPC .......... 123/179.3, 179.4; 701/113; 180/65.28, 180/65.285, 65.29
See application file for complete search history.

(56) References Cited

U.S. PATENT DOCUMENTS

| | | | |
|---|---|---|---|
| 6,494,809 B1 | 12/2002 | Suzuki et al. | |
| 6,886,648 B1 * | 5/2005 | Hata et al. | 180/65.235 |
| 2001/0013701 A1 * | 8/2001 | Onoyama et al. | 290/40 C |
| 2002/0084769 A1 | 7/2002 | Iritani et al. | |
| 2002/0096137 A1 * | 7/2002 | Kobayashi et al. | 123/179.4 |
| 2005/0080523 A1 * | 4/2005 | Bennett et al. | 701/22 |

(Continued)

FOREIGN PATENT DOCUMENTS

| | | |
|---|---|---|
| JP | 2000-270401 A | 9/2000 |
| JP | 2001-140673 A | 5/2001 |

(Continued)

*Primary Examiner* — Erick Solis
*Assistant Examiner* — Anthony L Bacon
(74) *Attorney, Agent, or Firm* — Kenyon & Kenyon LLP (57) ABSTRACT

A motor generator and a power converter are driven by an engine, to supply electric power to a power storage device. ECU causes the engine to start if SOC of the power storage device falls below a first threshold value, and causes the engine to stop if SOC exceeds a second threshold value which is larger than the first threshold value. During a vehicle stop, if SOC exceeds a third threshold value which is larger than the first threshold value and smaller than the second threshold value, ECU causes the engine to stop.

9 Claims, 5 Drawing Sheets

(56) References Cited

U.S. PATENT DOCUMENTS

| | | | |
|---|---|---|---|
| 2006/0150937 A1* | 7/2006 | Lupo | F02D 41/042 123/179.4 |
| 2007/0275808 A1 | 11/2007 | Iwanaka et al. | |
| 2009/0005923 A1* | 1/2009 | Shimizu et al. | 701/22 |
| 2009/0198438 A1 | 8/2009 | Jinno | |

FOREIGN PATENT DOCUMENTS

| | | |
|---|---|---|
| JP | 2002-262401 A | 9/2002 |
| JP | 2006-077641 A | 3/2006 |
| JP | 2007-223458 A | 9/2007 |
| JP | 2007-314032 A | 12/2007 |
| JP | 2008-008215 A | 1/2008 |
| JP | 2009-018743 A | 1/2009 |
| JP | 2010-100136 A | 5/2010 |
| JP | 2010-174827 A | 8/2010 |
| JP | 2010-202119 A | 9/2010 |
| JP | 2010-241396 A | 10/2010 |
| JP | 2010-285149 A | 12/2010 |

* cited by examiner

HYBRID VEHICLE AND METHOD FOR CONTROLLING THE SAME

CROSS REFERENCE TO RELATED APPLICATION

This is a national phase application based on the PCT International Patent Application No. PCT/JP2011/050928 filed on Jan. 20, 2011, the entire contents of which are incorporated herein by reference.

TECHNICAL FIELD

The present invention relates to a hybrid vehicle and a method for controlling the same, and more particularly to a hybrid vehicle having an internal combustion engine, a power storage device and a traction motor mounted thereon, as well as a method for controlling the same.

BACKGROUND ART

As an environmentally friendly vehicle, a hybrid vehicle having mounted thereon a traction motor that receives supply of electric power from a power storage device and an internal combustion engine, as sources of motive power.

Japanese Patent Laying-Open No. 2001-140673 (PTD 1) discloses an engine stop/start control device applicable to such a hybrid vehicle. This engine stop/start control device is employed in a vehicle in which the engine is stopped when a predetermined stop condition is met and the engine is started when a predetermined start condition is met. The engine stop/start control device includes means for detecting the shift position of the vehicle and means for, when the shift position is at a running position, changing the start condition to the side where the engine is unlikely to start as compared with the case of being at a non-running position.

It is supposed that this engine stop/start control device can minimize the number of times of starting the engine at the running position and reduce discomfort given to a driver (see PTD 1).

CITATION LIST

Patent Document

PTD 1: Japanese Patent Laying-Open No. 2001-140673
PTD 2: Japanese Patent Laying-Open No. 2010-174827
PTD 3: Japanese Patent Laying-Open No. 2009-18743
PTD 4: Japanese Patent Laying-Open No. 2006-77641
PTD 5: Japanese Patent Laying-Open No. 2008-8215

SUMMARY OF INVENTION

Technical Problem

When the charged state of the power storage device decreases, a hybrid vehicle generates electric power using the internal combustion engine, so that the power storage device is charged. For example, when a remaining capacity (hereinafter also referred to as "SOC" and presented percentage wise relative to a fully charged state, for example) of the power storage device falls below a predetermined first threshold value, the internal combustion engine is operated so that the power storage device is charged until SOC exceeds a second threshold value which is larger than the first threshold value. Even if the vehicle is at a stop, this charging will be executed if the charged state of the power storage device decreases.

However, a long operating time of the internal combustion engine during a vehicle stop may give discomfort to a user. In addition, charging during a vehicle stop is not desirable in terms of efficiency as well. Specifically, in general, the internal combustion engine operates with high efficiency at somewhat high power state. However, charging during a vehicle stop is not desirable in terms of efficiency because it is sufficient to operate the internal combustion engine in the low power state. It is therefore desirable that the internal combustion engine be stopped as long as possible during a vehicle stop while achieving recovery of the charged state of the power storage device if it decreases. The above-mentioned document, however, gives no specific consideration under what conditions the internal combustion engine should be stopped/started from a viewpoint of charged state. The present invention was therefore made to solve this problem, and has an object to, in a hybrid vehicle, stop an internal combustion engine as long as possible during a vehicle stop while achieving recovery of a charged state of a power storage device if the charged state decreases.

Solution to Problem

According to the present invention, a hybrid vehicle includes a power storage device, an internal combustion engine, at least one motor, and a control device. The at least one motor has an electric power generation function in which the motor is driven by the internal combustion engine to supply electric power to the power storage device and a function of producing running driving force. The control device is configured to control start and stop of the internal combustion engine based on a start/stop condition for the internal combustion engine set from a physical quantity relevant to a charged state of the power storage device. When the vehicle stops, the control device changes the start/stop condition for the internal combustion engine such that an operation duration of the internal combustion engine is shorter than during vehicle running.

Preferably, the physical quantity is a remaining capacity (SOC) of the power storage device. The control device causes the internal combustion engine to start if SOC falls below a first threshold value corresponding to the start condition for the internal combustion engine, and causes the internal combustion engine to stop if SOC exceeds a second threshold value corresponding to the stop condition for the internal combustion engine, which is larger than the first threshold value.

More preferably, during a vehicle stop, if SOC exceeds a third threshold value which is larger than the first threshold value and smaller than the second threshold value, the control device causes the internal combustion engine to stop.

Still more preferably, if SOC exceeds the third threshold value during a vehicle stop, the control device sets a vehicle operation mode at an economy running mode in which the internal combustion engine is stopped during a vehicle stop and is started as the vehicle starts running.

Preferably, when the vehicle stops, the control device changes the first threshold value to a value which is smaller than during vehicle running.

Preferably, the physical quantity is a voltage of the power storage device. The control device causes the internal combustion engine to start if the voltage falls below a first threshold value corresponding to the start condition for the internal combustion engine, and causes the internal combustion engine to stop if the voltage exceeds a second threshold value corresponding to the stop condition for the internal combustion engine, which is larger than the first threshold value.

More preferably, during a vehicle stop, if the voltage exceeds a third threshold value which is larger than the first threshold value and smaller than the second threshold value, the control device causes the internal combustion engine to stop.

Still more preferably, when the vehicle stops, the control device changes the first threshold value to a value which is smaller than during vehicle running.

Preferably, the physical quantity includes an elapsed time from the start of charging of the power storage device. After the internal combustion engine is started based on the start condition for the internal combustion engine, the control device causes the internal combustion engine to stop if the elapsed time exceeds a threshold time corresponding to the stop condition for the internal combustion engine.

More preferably, when the vehicle stops, the control device changes the threshold time to a time which is shorter than during vehicle running.

Further, according to the present invention, a method for controlling is a method for controlling a hybrid vehicle. The hybrid vehicle includes a power storage device, an internal combustion engine, and at least one motor. The at least one motor has an electric power generation function in which the motor is driven by the internal combustion engine to supply electric power to the power storage device and a function of producing running driving force. The method for controlling includes the steps of controlling start and stop of the internal combustion engine based on a start/stop condition for the internal combustion engine set from a physical quantity relevant to a charged state of the power storage device, and when the vehicle stops, changing the start/stop condition for the internal combustion engine such that an operation duration of the internal combustion engine is shorter than during vehicle running.

Preferably, the physical quantity is a remaining capacity (SOC) of the power storage device. The step of controlling start/stop of the internal combustion engine includes the steps of starting the internal combustion engine if SOC falls below a first threshold value corresponding to the start condition for the internal combustion engine, and stopping the internal combustion engine if SOC exceeds a second threshold value corresponding to the stop condition for the internal combustion engine, which is larger than the first threshold value.

More preferably, the step of changing start/stop condition for the internal combustion engine includes the step of, when the vehicle stops, changing the stop condition for the internal combustion engine to a third threshold value which is larger than the first threshold value and smaller than the second threshold value.

Still more preferably, the method for controlling further includes the step of, if SOC exceeds the third threshold value during a vehicle stop, setting a vehicle operation mode at an economy running mode in which the internal combustion engine is stopped during a vehicle stop and is started as the vehicle starts running.

Preferably, the step of changing start/stop condition for the internal combustion engine includes the step of, when the vehicle stops, changing the first threshold value to a value which is smaller than during vehicle running.

Advantageous Effects of Invention

In the present invention, start and stop of the internal combustion engine is controlled based on a start/stop condition for the internal combustion engine set from the physical quantity relevant to the charged state of the power storage device. When the vehicle stops, the start/stop condition for the internal combustion engine is changed such that the operation duration of the internal combustion engine is shorter than during vehicle running. Therefore, the internal combustion engine can be stopped as long as possible during a vehicle stop while achieving recovery of the charged state of the power storage device if the charged state decreases. Therefore, according to the present invention, user's discomfort can be reduced. In addition, fuel efficiency can be improved by restraining charging during a vehicle stop.

DESCRIPTION OF EMBODIMENTS

Referring to the drawings, embodiments of the present invention will be described below in detail. In the drawings, the same or corresponding portions are denoted by the same reference characters, and description thereof will not be repeated.

[First Embodiment]

Figure 1:
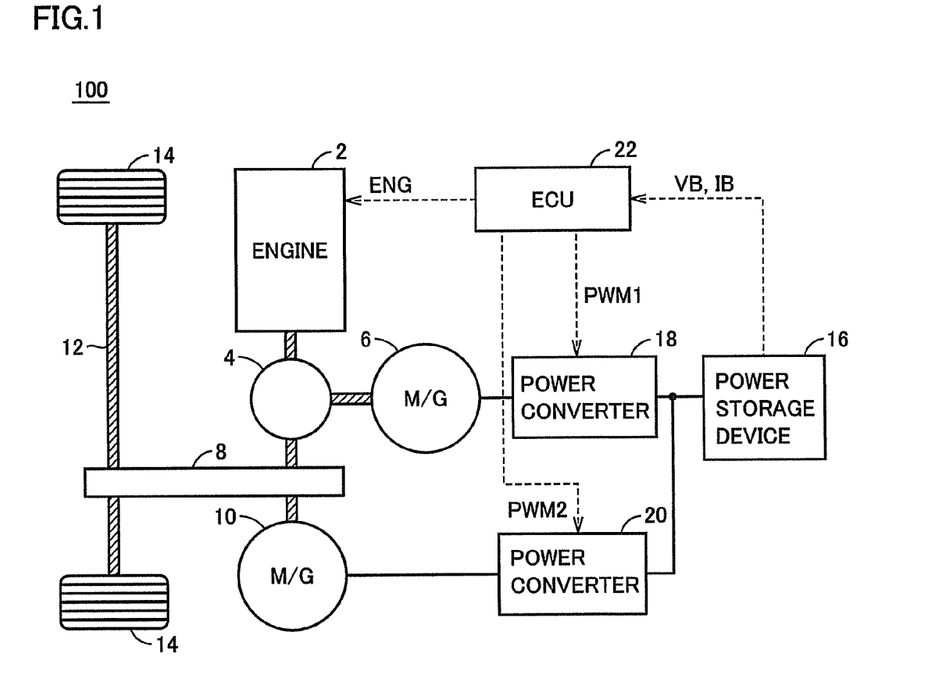
FIG. 1 is an overall block diagram of a hybrid vehicle according to a first embodiment of the present invention.

FIG. 1 is an overall block diagram of a hybrid vehicle according to a first embodiment of the present invention. Referring to FIG. 1, a hybrid vehicle 100 includes an engine 2, a power split device 4, motor generators 6, 10, a transmission gear 8, a drive shaft 12, and wheels 14. Hybrid vehicle 100 further includes a power storage device 16, power converters 18, 20, and an electronic control unit (hereinafter referred to as "ECU") 22.

Power split device 4 is coupled to engine 2, motor generator 6 and transmission gear 8 to distribute motive power among them. For example, a planetary gear having three rotation shafts of a sun gear, a planetary carrier and a ring gear can be used as power split device 4. These three rotation shafts are connected to the rotation shafts of motor generator 6, engine 2 and transmission gear 8, respectively. The rotation shaft of motor generator 10 is coupled to that of transmission gear 8. That is, motor generator 10 and transmission gear 8 share the same rotation shaft, which is connected to the ring gear of power split device 4.

Kinetic energy produced by engine 2 is distributed to motor generator 6 and transmission gear 8 by power split device 4. That is, engine 2 is incorporated into hybrid vehicle 100 as a power source that drives transmission gear 8 transmitting motive power to drive shaft 12 and drives motor generator 6. Motor generator 6 is incorporated into hybrid vehicle 100 to operate as a generator driven by engine 2 and as a motor capable of starting engine 2. Motor generator 10 is incorporated into hybrid vehicle 100 to operate as a power source that drives transmission gear 8 transmitting motive power to drive shaft 12.

Power storage device 16 is a rechargeable DC power source, and is implemented by, for example, a nickel-metal hydride, lithium ion or similar secondary battery. Power storage device 16 supplies electric power to power converters 18 and 20. Power storage device 16 is charged with electric power received from power converter 18 and/or power converter 20 during power generation of motor generator 6 and/or motor generator 10. A large-capacitance capacitor may be employed as power storage device 16. Any electric power buffer may be used that can temporarily store electric power generated by motor generators 6 and 10 and supply the stored electric power to motor generators 6 and 10. A voltage VB at power storage device 16 and a current 1B flowing in/out of power storage device 16 are detected by sensors not shown, and their detected values are output to ECU 22.

Based on a signal PWM1 from ECU 22, power converter 18 converts electric power generated by motor generator 6 into DC power for output to power storage device 16. Based on a signal PWM2 from ECU 22, power converter 20 converts DC power supplied from power storage device 16 into AC power for output to motor generator 10. At the time of starting engine 2, power converter 18, based on signal PWM1, converts DC power supplied from power storage device 16 into AC power for output to motor generator 6. During braking of the vehicle or reduction in the acceleration on a down slope, power converter 20, based on signal PWM2, converts electric power generated by motor generator 10 into DC power for output to power storage device 16. It is noted that power converters 18 and 20 are each implemented by an inverter including three-phase switching elements, for example.

Motor generators 6 and 10 are AC motors, and are each implemented by, for example, a three-phase synchronous motor with permanent magnets embedded in a rotor. Motor generator 6 converts kinetic energy produced by engine 2 into electric energy for output to power converter 18. Motor generator 6 generates driving force by three-phase AC power received from power converter 18 to start engine 2.

Motor generator 10 generates driving torque for the vehicle by three-phase AC power received from power converter 20. During braking of the vehicle or reduction in the acceleration on a down slope, motor generator 10 converts mechanical energy stored in the vehicle as kinetic energy or potential energy into electric energy for output to power converter 20.

Engine 2 converts thermal energy produced by fuel combustion into kinetic energy for a movable member such as a piston or a rotor, and outputs the converted kinetic energy to power split device 4. For example, assuming that the movable member is a piston and is making a reciprocating motion, the reciprocating motion is converted into a rotational motion through a so-called crank mechanism, and the kinetic energy of the piston is transmitted to power split device 4.

ECU 22 controls power converters 18, 20 and engine 2 by software processing by CPU (Central Processing Unit) executing a program stored previously and/or hardware processing by a dedicated electronic circuit. Specifically, ECU 22 generates signals PWM1 and PWM2 for driving power converters 18 and 20, respectively, and outputs generated signals PWM1 and PWM2 to power converters 18 and 20, respectively. ECU 22 also generates a signal ENG for controlling engine 2, and outputs generated signal ENG to engine 2. Furthermore, ECU 22 calculates SOC of power storage device 16 based on detected values of voltage VB and current IB at power storage device 16, and controls SOC of power storage device 16 based on the calculated value.

ECU 22 then controls start and stop of engine 2 based on the start/stop condition for engine 2 set based on SOC. Here, when the vehicle stops, ECU 22 changes the start/stop condition for engine 2 such that the operation duration of engine 2 is shorter than during vehicle running.

Figure 2:
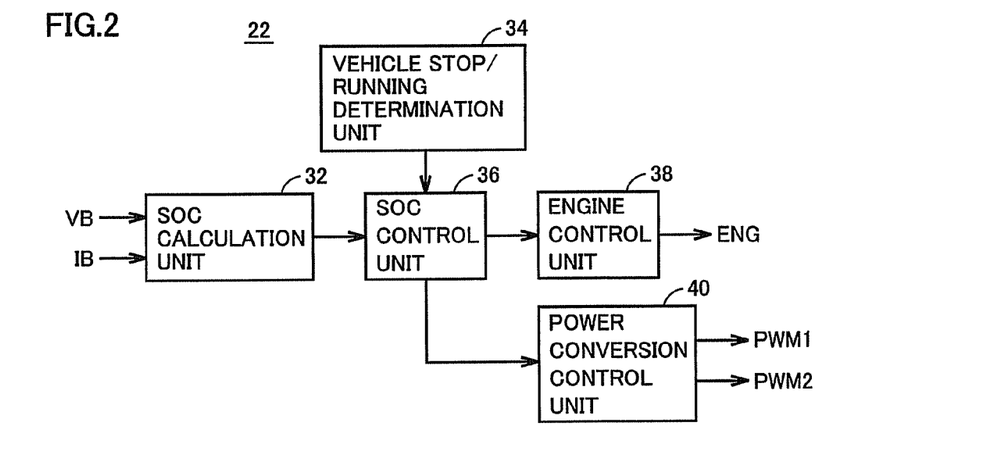
FIG. 2 is a functional block diagram of ECU.

FIG. 2 is a functional block diagram of ECU 22. Referring to FIG. 2, ECU 22 includes an SOC calculation unit 32, a vehicle stop/running determination unit 34, an SOC control unit 36, an engine control unit 38, and a power conversion control unit 40.

SOC calculation unit 32 calculates the SOC of power storage device 16 based on the respective detected values of voltage VB and current IB at power storage device 16, and outputs the result of calculation to SOC control unit 36. It is noted that calculation of the SOC can be performed with any of various publicly-known techniques.

Vehicle stop/running determination unit 34 determines whether the vehicle is in a vehicle stop state or in a running state, and outputs the result of determination to SOC control unit 36. It is noted that "a vehicle stop" here refers to the state where the vehicle is at a stop by pressing down of a brake pedal, not a shutdown of the vehicle system. It is noted that vehicle stop/running determination unit 34 determines a vehicle stop/running in accordance with, for example, vehicle speed, accelerator pedal/brake pedal press-down degree, shift position, and the like.

SOC control unit 36 controls SOC of power storage device 16. Specifically, if SOC falls below a threshold value L and when engine 2 is at a stop, SOC control unit 36 outputs a start instruction for engine 2 to engine control unit 38 and power conversion control unit 40. SOC control unit 36 then outputs a power generation instruction for motor generator 6 to power conversion control unit 40. If SOC exceeds a threshold value U1 (L<U1), SOC control unit 36 outputs a stop instruction for engine 2 to engine control unit 38.

Here, when the vehicle is at a stop and if SOC exceeds a threshold value U2 which is smaller than threshold value U1 (L<U2<U1), SOC control unit 36 outputs the stop instruction for engine 2 to engine control unit 38, and sets the vehicle operation mode at an economy running mode. It is noted that the economy running mode is a mode in which engine 2 is stopped during a vehicle stop and is started as the vehicle starts running. That is, during a vehicle stop, if SOC exceeds threshold value U2, SOC control unit 36 causes engine 2 to stop, and if running is started afterward, outputs the start instruction for engine 2 to engine control unit 38 and power conversion control unit 40, and outputs the power generation instruction for motor generator 6 to power conversion control unit 40. It is noted that, while the vehicle is running, SOC control unit 36 does not output the stop instruction for engine 2 to engine control unit 38 until SOC exceeds threshold value U1.

Engine control unit 38 generates signal ENG for controlling engine 2, and outputs generated signal ENG to engine 2. Upon receipt of the start instruction for engine 2 from SOC control unit 36, engine control unit 38 generates signal ENG for instructing operation of engine 2, and outputs the signal to engine 2. Upon receipt of the stop instruction for engine 2 from SOC control unit 36, engine control unit 38 generates signal ENG for instructing stop of engine 2, and outputs the signal to engine 2.

Power conversion control unit 40 generates signals PWM1 and PWM2 for driving power converters 18 and 20, respectively, and outputs generated signals PWM1 and PWM2 to power converters 18 and 20, respectively. Upon receipt of the start instruction for engine 2 from SOC control unit 36, power conversion control unit 40 generates signal PWM1 for power running of motor generator 6, and outputs the signal to power converter 18. Upon receipt of the power generation instruction for motor generator 6 from SOC control unit 36, power conversion control unit 40 generates signal PWM1 for regeneration driving of motor generator 6, and outputs the signal to power converter 18. While the vehicle is running, power conversion control unit 40 generates signal PWM2 for driving motor generator 10, and outputs the signal to power converter 20.

In this ECU 22, if SOC falls below threshold value L (engine start condition) and when engine 2 is at a stop, control for starting engine 2 is performed. If SOC exceeds threshold value U1 (L<U1) (engine stop condition), control for stopping engine 2 is performed. Here, during a vehicle stop, if SOC exceeds threshold value U2 which is smaller than threshold value U1 (L<U2<U1), control for stopping engine 2 is performed. That is, when the vehicle stops, the stop condition for engine 2 is changed such that the operation duration of engine 2 is shorter than during vehicle running.

Figure 3:
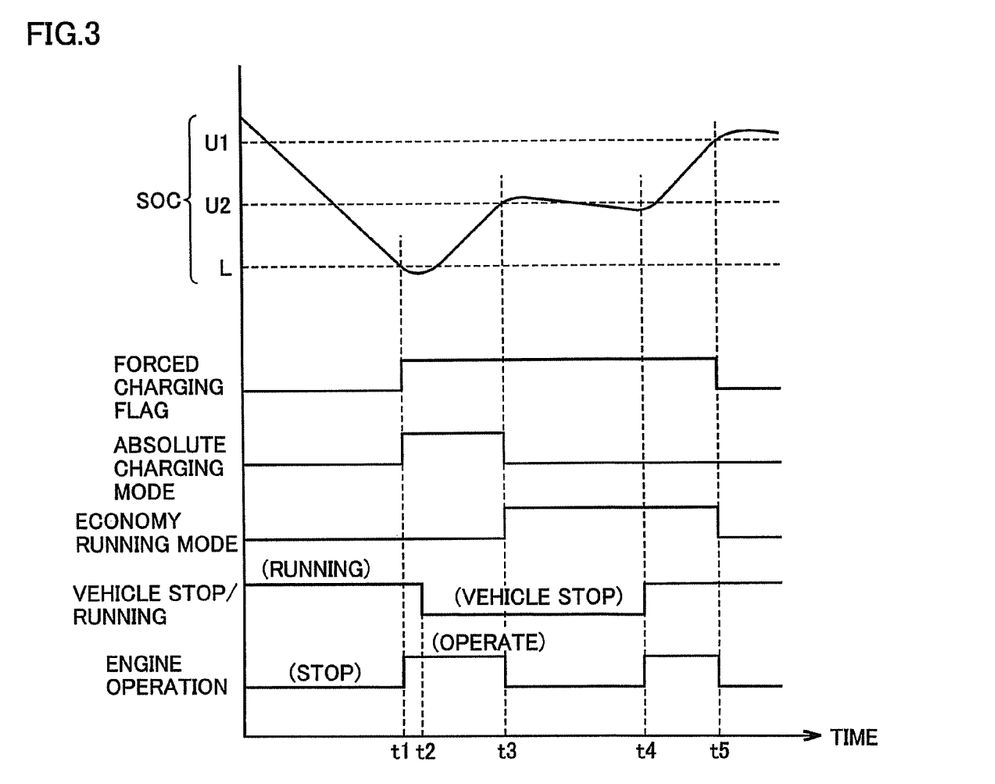
FIG. 3 illustrates an example of time changes in SOC of a power storage device.

FIG. 3 illustrates an example of time changes in SOC of power storage device 16. Referring to FIG. 3, before time t1, the vehicle shall be running by motor generator 10 with engine 2 stopped. When SOC decreases by running and falls below threshold value L at time t1, a forced charging flag is turned on. This forced charging flag remains on until SOC is recovered to threshold value U1 (L<U1). The vehicle operation mode is set at an "absolute charging mode." The absolute charging mode is a mode in which charging of power storage device 16 is carried out whether the vehicle is at a stop or running. Engine 2 is then started, and SOC starts increasing.

The vehicle shall be stopped at time t2. In the absolute charging mode, even during a vehicle stop, engine 2 is operated giving priority to recovery of SOC. When SOC reaches threshold value U2 (L<U2<U1) at time t3, the vehicle operation mode changes to the "economy running mode." The economy running mode is a mode in which engine 2 is stopped during a vehicle stop, and is started as the vehicle starts running, as described above. Here, since the vehicle is at a stop, engine 2 is stopped. It is noted that, conventionally, engine 2 is operated even during a vehicle stop until SOC reaches threshold value U1, so that the engine operating time during a vehicle stop is long. In contrast, in this first embodiment, the engine operating time during a vehicle stop is shorter because engine 2 is stopped at time t3.

At time t4, when a driver presses down the accelerator pedal to start running, engine 2 is started and SOC starts increasing. When SOC exceeds threshold value U1 (U2<U1), the forced charging flag is turned off, the economy running mode is terminated, and engine 2 is stopped.

Figure 4:
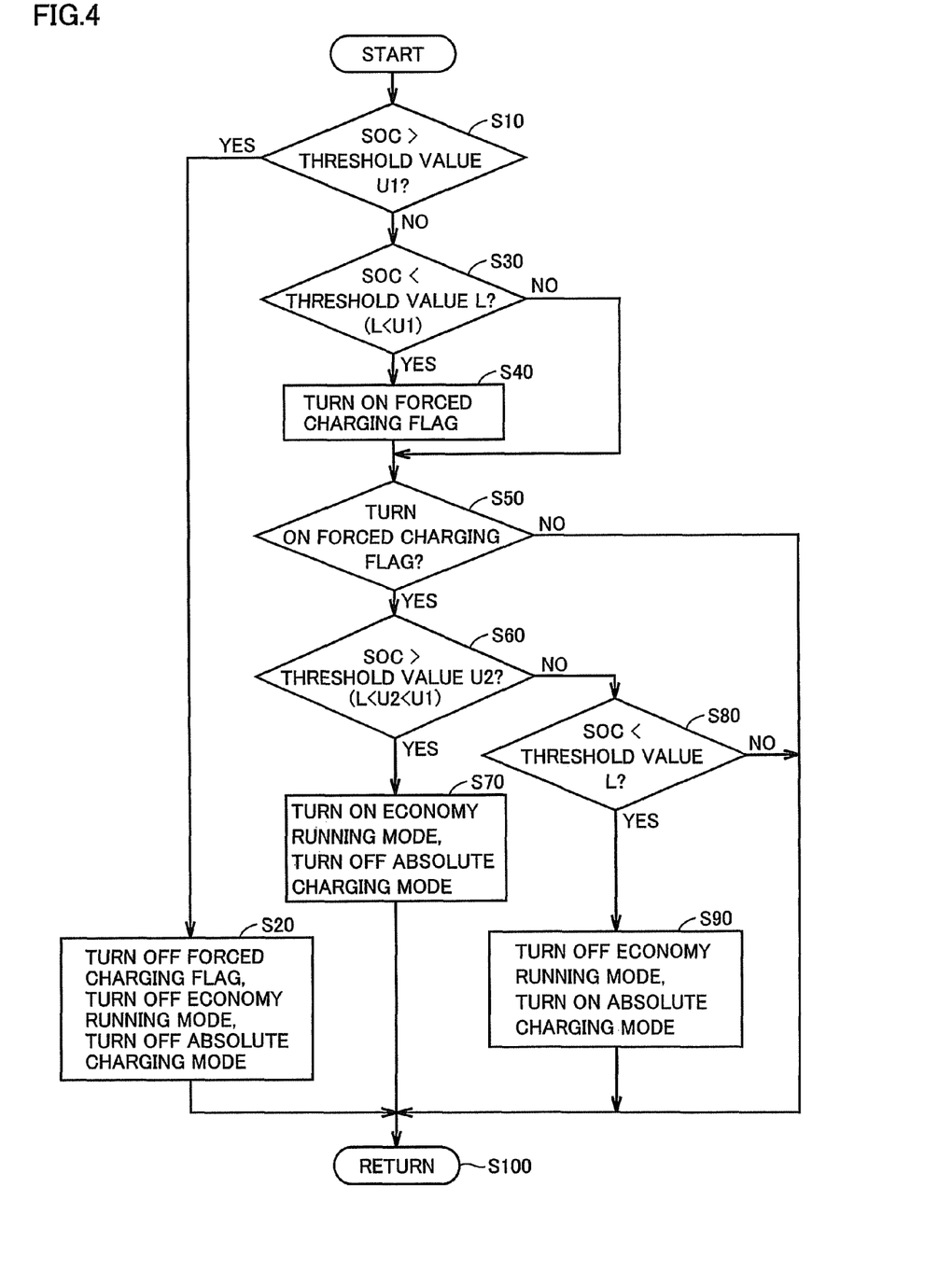
FIG. 4 is a flowchart for illustrating the procedure of SOC control executed by ECU.

FIG. 4 is a flowchart for illustrating the procedure of SOC control executed by ECU 22. The process shown in this flow chart is invoked from a main routine and executed at regular time intervals or when predetermined conditions are met.

Referring to FIG. 4, ECU 22 calculates SOC based on voltage VB and current IB of power storage device 16, and determines whether or not the calculated SOC is higher than threshold value U1 (step S10). If it is determined that SOC is higher than threshold value U1 (YES in step S10), ECU 22 turns off the forced charging flag, and also turns off the economy running mode and the absolute charging mode (step S20). Accordingly, if engine 2 is operating at this time, engine 2 is stopped.

On the other hand, if it is determined that SOC is less than or equal to threshold value U1 in step S10 (NO in step S10), ECU 22 determines whether or not SOC is lower than threshold value L (L<U1) (step S30). If it is determined that SOC is lower than threshold value L (YES in step S30), ECU 22 turns on the forced charging flag (step S40). It is noted that if it is determined that SOC is more than or equal to threshold value L (NO in step S30), ECU 22 advances the process to step S50. Then, ECU 22 determines whether or not the forced charging flag has been turned on (step S50). If the forced charging flag is off (NO in step S50), ECU 22 advances the process to step S100 without executing subsequent processing.

If it is determined that the forced charging flag has been turned on in step S50 (YES in step S50), ECU 22 determines whether or not SOC is higher than threshold value U2 (L<U2<U1) (step S60). If it is determined that SOC is higher than threshold value U2 (YES in step S60), ECU 22 turns on the economy running mode and turns off the absolute charging mode (step S70). Accordingly, if the vehicle is at a stop at this time, engine 2 is stopped.

On the other hand, if it is determined that SOC is less than or equal to threshold value U2 in step S60 (NO in step S60), ECU 22 determines whether or not SOC is lower than threshold value L (step S80). If it is determined that SOC is lower than threshold value L (YES in step S80), ECU 22 turns on the absolute charging mode and turns off the economy running mode (step S90). Accordingly, if engine 2 is at a stop at this time whether the vehicle is at a stop or running, engine 2 is started. It is noted that if it is determined that SOC is more than or equal to threshold value L in step S80 (NO in step S80), ECU 22 advances the process to step S100.

It is noted that, in this flowchart, processing in steps S80, S90 and steps S10, S20 corresponds to "control start and stop of the internal combustion engine based on a start/stop condition for the internal combustion engine set from a physical quantity relevant to a charged state of the power storage device." The processing in steps S60 and S70 corresponds to "when the vehicle stops, changing the start/stop condition for the internal combustion engine such that an operation duration of the internal combustion engine is shorter than during vehicle running."

The processing executed in step S90 corresponds to "causing the internal combustion engine to start if SOC falls below a first threshold value (L) corresponding to the start condition for the internal combustion engine." The processing executed in step S20 corresponds to "causing the internal combustion engine to stop if SOC exceeds a second threshold value (U1) corresponding to the stop condition for the internal combustion engine, which is larger than the first threshold value (L)." The processing in steps S60 and S70 corresponds to "when the vehicle stops, changing the stop condition for the internal combustion engine to a third threshold value (U2) which is larger than the first threshold value (L) and smaller than the second threshold value (U1)."

As described above, in this first embodiment, during a vehicle stop, if SOC exceeds threshold value U2 which is smaller than threshold value U1, the vehicle operation mode changes to the economy running mode, and engine 2 is stopped. Accordingly, if SOC decreases, engine 2 can be left stopped as long as possible during a vehicle stop while achieving recovery of SOC. Therefore, according to this first embodiment, user's discomfort can be reduced. In addition, fuel efficiency can be improved by restraining charging during a vehicle stop.

[Second Embodiment]

SOC control similar to that of the first embodiment can be achieved by the procedure shown in the flowchart as will be described below, instead of the flowchart shown in FIG. 4.

The overall configuration of a hybrid vehicle according to this second embodiment is the same as that of hybrid vehicle 100 shown in FIG. 1.

Figure 5:
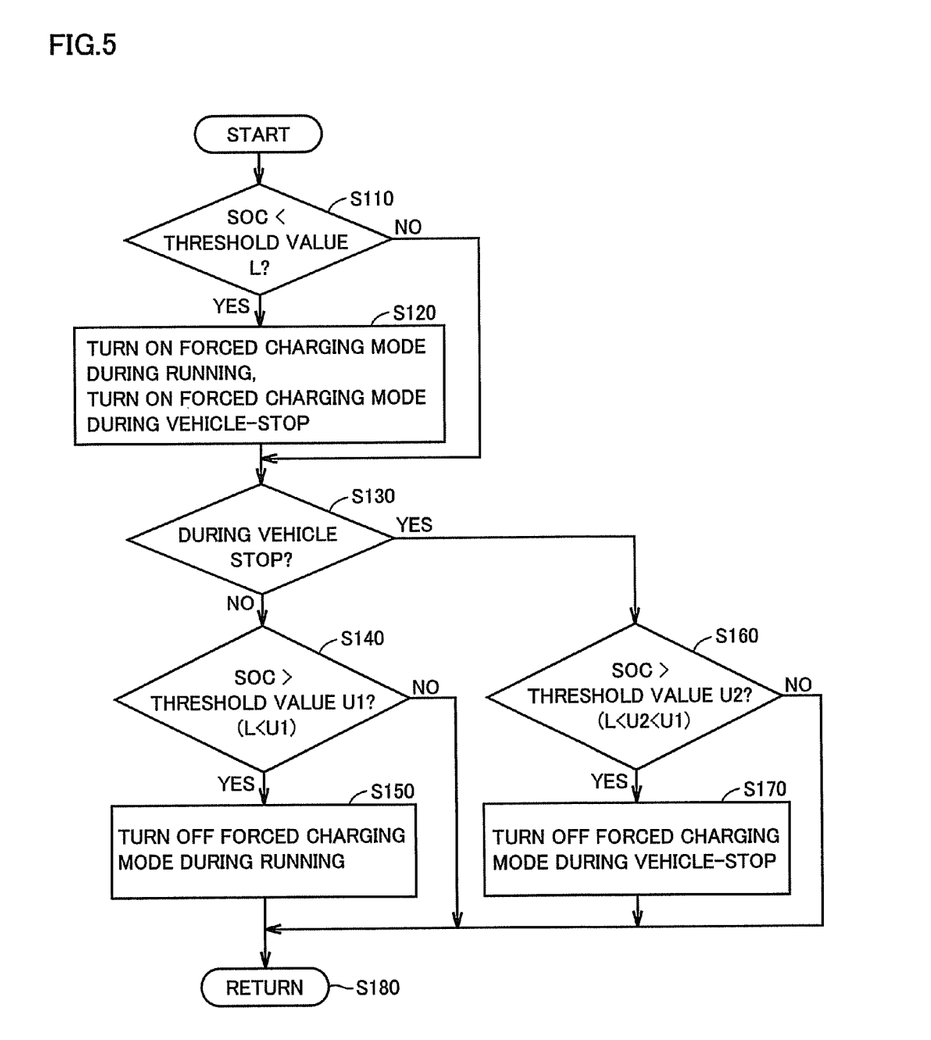
FIG. 5 is a flowchart for illustrating the procedure of SOC control in a second embodiment.

FIG. 5 is a flowchart for illustrating the procedure of SOC control in the second embodiment. It is noted that the process in this flow chart is also invoked from a main routine and executed at regular time intervals or when predetermined conditions are met.

Referring to FIG. 5, ECU 22 determines whether or not SOC calculated based on voltage VB and current IB of power storage device 16 is lower than threshold value L (step S110). If it is determined that SOC is lower than threshold value L (YES in step S110), ECU 22 turns on a forced charging mode during running and a forced charging mode during vehicle-stop (step S120). Here, the forced charging mode during running is a mode in which engine 2 is operated while the vehicle is running to charge power storage device 16. The forced charging mode during vehicle-stop is a mode in which engine 2 is operated during a vehicle stop to charge power storage device 16. Therefore, in this step S120, charging of power storage device 16 is started whether the vehicle is at a stop or running. It is noted that if it is determined that SOC is more than or equal to threshold value L (NO in step S110), ECU 22 advances the process to step S130.

Then, ECU 22 determines whether or not the vehicle is at a stop (step S130). If it is determined that the vehicle is not at a stop, that is, running (NO in step S130), ECU 22 determines whether or not SOC is higher than threshold value U1 (L<U1) (step S140). If it is determined that SOC is higher than threshold value U1 (YES in step S140), ECU 22 turns off the forced charging mode during running (step S150). Accordingly, engine 2 is stopped, and charging of power storage device 16 is stopped. It is noted that if it is determined that SOC is less than or equal to threshold value U1 in step S140 (NO in step S140), ECU 22 advances the process to step S180.

On the other hand, if it is determined that the vehicle is at a stop in step S130 (YES in step S130), ECU 22 determines whether or not SOC is higher than threshold value U2 (L<U2<U1) (step S160). If it is determined that SOC is higher than threshold value U2 (YES in step S160), ECU 22 turns off the forced charging mode during vehicle-stop (step S170). Accordingly, engine 2 is stopped, and charging of power storage device 16 is stopped. It is noted that if it is determined that SOC is less than or equal to threshold value U2 in step S160 (NO in step S160), ECU 22 advances the process to step S180.

It is noted that, in this flowchart, the processing in steps S110, S120 and steps S140, S150 corresponds to "control start and stop of the internal combustion engine based on a start/stop condition for the internal combustion engine set from a physical quantity relevant to a charged state of the power storage device." The processing in steps S160 and S170 corresponds to "when the vehicle stops, changing the start/stop condition for the internal combustion engine such that an operation duration of the internal combustion engine is shorter than during vehicle running."

The processing executed in step S120 corresponds to "causing the internal combustion engine to start if SOC falls below a first threshold value (L) corresponding to the start condition for the internal combustion engine." The processing executed in step S150 corresponds to "causing the internal combustion engine to stop if SOC exceeds a second threshold value (U1) corresponding to the stop condition for the internal combustion engine, which is larger than the first threshold value (L)." The processing in steps S160 and S170 corresponds to "when the vehicle stops, changing the stop condition for the internal combustion engine to a third threshold value (U2) which is larger than the first threshold value (L) and smaller than the second threshold value (U1)."

As described above, in this second embodiment, if SOC falls below threshold value L, engine 2 is operated to charge power storage device 16. If the vehicle is running and if SOC exceeds threshold value U1 (L<U1), engine 2 is stopped, and charging of power storage device 16 is stopped. If the vehicle is at a stop and if SOC exceeds threshold value U2 which is smaller than threshold value U1 (L<U2<U1), engine 2 is stopped, and charging of power storage device 16 is stopped. Therefore, this second embodiment can achieve functions similar to those of the first embodiment, and effects similar to those of the first embodiment are obtained.

[Third Embodiment]

In the above-described first and second embodiments, the threshold value of SOC at which engine 2 started due to decrease in SOC is stopped differs between vehicle running and vehicle stop. In this third embodiment, the threshold value of SOC at which engine 2 is started differs between vehicle running and vehicle stop. Specifically, while the vehicle is at a stop, the threshold value of SOC at which engine 2 is started is set at a value which is smaller than while the vehicle is running. Accordingly, engine 2 can be left stopped as long as possible during a vehicle stop.

The overall configuration of a hybrid vehicle according to this third embodiment is the same as that of hybrid vehicle 100 shown in FIG. 1.

Figure 6:
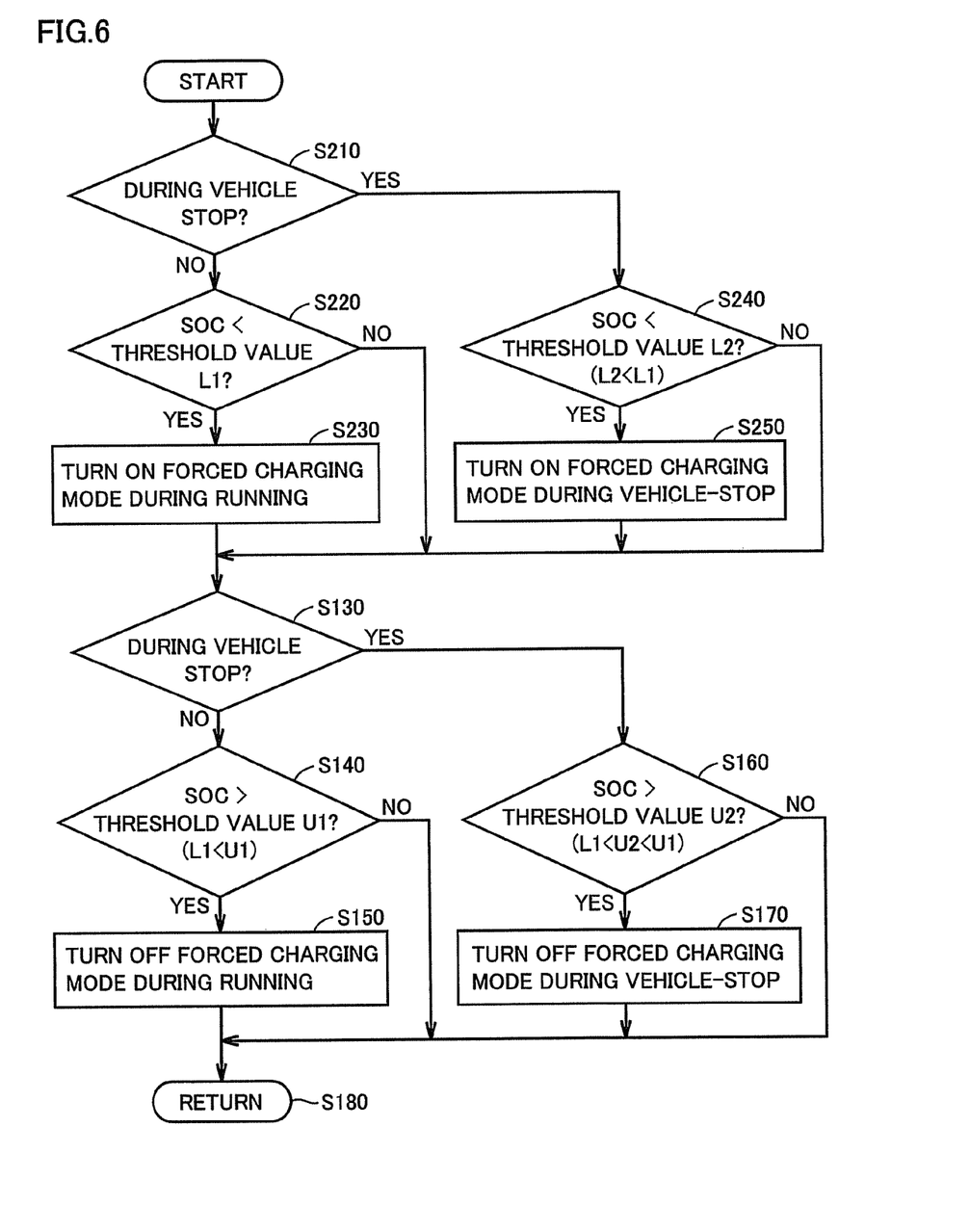
FIG. 6 is a flowchart for illustrating the procedure of SOC control in a third embodiment.

FIG. 6 is a flowchart for illustrating the procedure of SOC control in the third embodiment. The process in this flow chart is also invoked from a main routine and executed at regular time intervals or when predetermined conditions are met.

Referring to FIG. 6, this flow chart includes steps S210 to S250 instead of steps S110 and S120 in the flow chart shown in FIG. 5. That is, ECU 22 determines whether or not the vehicle is at a stop (step S210). If it is determined that the vehicle is not at a stop, that is, running (NO in step S210), ECU 22 determines whether or not SOC is lower than a threshold value L1 (step S220).

If it is determined that SOC is lower than threshold value L1 in step S220 (YES in step S220), ECU 22 turns on the forced charging mode during running (step S230). Accordingly, engine 2 is started, so that power storage device 16 is charged. It is noted that if it is determined that SOC is more than or equal to threshold value L1 in step S220 (NO in step S220) ECU 22 advances the process to step S130.

On the other hand, if it is determined that the vehicle is at a stop in step S210 (YES in step S210), ECU 22 determines whether or not SOC is lower than a threshold value L2 (L2<L1) (step S240).

If it is determined that SOC is lower than threshold value L2 in step S240 (YES in step S240), ECU 22 turns on the forced charging mode during vehicle-stop (step S250). Accordingly, engine 2 is started, so that power storage device 16 is charged. It is noted that if it is determined that SOC is more than or equal to threshold value L2 in step S240 (NO in step S240), ECU 22 advances the process to step S130.

It is noted that the processing in step S130 and subsequent steps is the same as that of the flowchart shown in FIG. 5, and description thereof will not be repeated.

It is noted that, in this flowchart, the processing in steps S240 and S250 corresponds to "when the vehicle stops, changing the first threshold value to a value which is smaller than during vehicle running."

As described above, in this third embodiment, if the vehicle is running and if SOC falls below threshold value L1, engine 2 is started to charge power storage device 16. On the other hand, if the vehicle is at a stop and if SOC falls below threshold value L2 (L2<L1) which is smaller than threshold value L1, engine 2 is started to charge power storage device 16. Therefore, according to this third embodiment, engine start during a vehicle stop can further be restrained.

It is noted that, in the above-described third embodiment, the stop condition for engine 2 shall also be changed (steps S130 to S170), however, the effect of restraining engine start during a vehicle stop is obtained merely by changing the start condition for engine 2 (steps S210 to S250).

Although in each of the above-described embodiments, start/stop of engine 2 shall be controlled based on SOC of power storage device 16, another physical quantity relevant to the charged state of power storage device 16 may be used instead of SOC.

For example, start/stop of engine 2 may be controlled based on voltage VB of power storage device 16. Specifically, if voltage VB falls below a first threshold value corresponding to the start condition for engine 2, engine 2 is started. If voltage VB exceeds a second threshold value corresponding to the stop condition for engine 2, which is larger than the first threshold value, engine 2 is stopped. When the vehicle stops, if voltage VB exceeds a third threshold value which is larger than the first threshold value and smaller than the second threshold value, engine 2 may be stopped. When the vehicle stops, the first threshold value may be changed to a value which is smaller than during vehicle running.

As the physical quantity relevant to the charged state of power storage device 16, the time elapsed from the start of charging of power storage device 16 may be used. Specifically, after engine 2 is started based on the start condition for engine 2, engine 2 is stopped when the elapsed time exceeds a threshold time corresponding to the stop condition for engine 2. When the vehicle stops, the threshold time may be changed to a time which is shorter than during vehicle running.

While each of the above embodiments has described a series/parallel-type hybrid vehicle in which the motive power of engine 2 divided by power split device 4 can be transmitted to transmission gear 8 and motor generator 6, the present invention is also applicable to other types of hybrid vehicles. Specifically, the present invention is also applicable to, but not limited to, a series-type hybrid vehicle in which engine 2 is used solely to drive motor generator 6 and the driving force for the vehicle is produced solely by motor generator 10, a single motor-type hybrid vehicle mainly powered by the engine and assisted by a motor as necessary in which that motor can also be used as a power generator to charge a power storage device, and the like. The present invention is also applicable to a so-called plug-in hybrid vehicle in which power storage device 16 can be charged by a power supply outside the vehicle.

In the foregoing, engine 2 corresponds to an embodiment of "an internal combustion engine" according to the present invention. Motor generators 6 and 10 correspond to an embodiment of "at least one motor" according to the present invention. ECU 22 corresponds to an embodiment of "a control device" according to the present invention.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

REFERENCE SIGNS LIST

2 engine; 4 power split device; 6, 10 motor generator; 8 transmission gear; 12 driving shaft; 14 wheel; 16 power storage device; 18, 20 power converter; 22 ECU; 32 SOC calculation unit; 34 vehicle stop/running determination unit; 36 SOC control unit; 38 engine control unit; 40 power conversion control unit; 100 hybrid vehicle.

The invention claimed is:

1. A hybrid vehicle comprising:
   a power storage device;
   an internal combustion engine;
   at least one motor having an electric power generation function in which the motor is driven by said internal combustion engine to supply electric power to said power storage device and a function of producing running driving force; and
   a control device configured to:
      control a start condition and a stop condition of said internal combustion engine based on a remaining capacity of said power storage device,
      determine whether the vehicle is in a standstill state or a moving state,
      change at least one of the start condition and the stop condition such that an operation duration of said internal combustion engine is shorter during the standstill state than during the moving state,
      start said internal combustion engine when said remaining capacity falls below a first threshold corresponding to the start condition,
      stop said internal combustion engine when said remaining capacity exceeds a second threshold corresponding to the stop condition, said second threshold being larger than said first threshold, and
      change a value of the second threshold such that the value is larger when the vehicle is determined to be in the moving state than when the vehicle is determined to be in the standstill state.

2. The hybrid vehicle according to claim 1, wherein, when said remaining capacity exceeds said second threshold during the standstill state, said control device is configured to set a vehicle operation mode at an economy running mode in which said internal combustion engine is stopped during the standstill state and is started as the vehicle starts moving.

3. The hybrid vehicle according to claim 1, wherein, when the vehicle is determined to be in the standstill state, said control device is configured to change a value of said first threshold to be smaller than during the moving state.

4. A hybrid vehicle comprising:
   a power storage device;
   an internal combustion engine;
   at least one motor having an electric power generation function in which the motor is driven by said internal combustion engine to supply electric power to said power storage device and a function of producing running driving force; and
   a control device configured to:
      control a start condition and a stop condition of said internal combustion engine based on a voltage of said power storage device,
      determine whether the vehicle is in a standstill state or a moving state,
      change at least one of the start condition and the stop condition such that an operation duration of said internal combustion engine is shorter during the standstill state than during the moving state,
      start said internal combustion engine when said voltage falls below a first threshold corresponding to the start condition,
      stop said internal combustion engine when said voltage exceeds a second threshold corresponding to the stop condition, said second threshold being larger than said first threshold, and
      change a value of the second threshold such that the value is larger when the vehicle is determined to be in the moving state than when the vehicle is determined to be in the standstill state.

5. The hybrid vehicle according to claim 4, wherein, when the vehicle is determined to be in the standstill state, said control device is configured to change a value of said first threshold to be smaller than during the moving state.

6. A hybrid vehicle comprising:
a power storage device;
an internal combustion engine;
at least one motor having an electric power generation function in which the motor is driven by said internal combustion engine to supply electric power to said power storage device and a function of producing running driving force; and
a control device configured to:
control a start condition and a stop condition of said internal combustion engine based on an elapsed time from the start of charging of said power storage device,
determine whether the vehicle is in a standstill state or a moving state,
change at least one of the start condition and the stop condition such that an operation duration of said internal combustion engine is shorter during the standstill state than during the moving state,
after said internal combustion engine is started based on the start condition stop said internal combustion engine when said elapsed time exceeds a threshold time corresponding to the stop condition, and
change said threshold time such that said threshold time is longer when the vehicle is determined to be in the moving state than when the vehicle is determined to be in the standstill state.

7. A method for controlling a hybrid vehicle said hybrid vehicle including:
a power storage device,
an internal combustion engine, and
at least one motor having an electric power generation function in which the motor is driven by said internal combustion engine to supply electric power to said power storage device and a function of producing running driving force;
said method comprising the steps of:
controlling a start condition and a stop condition of said internal combustion engine based on a remaining capacity of said power storage device;
determining whether the vehicle is in a standstill state or a moving state;
changing at least one of the start condition and the stop condition such that an operation duration of said internal combustion engine is shorter during the standstill state than during the moving state;
starting said internal combustion engine when said remaining capacity falls below a first threshold corresponding to the start condition;
stopping said internal combustion engine when said remaining capacity exceeds a second threshold corresponding to the stop condition, which is larger than said first threshold, and
changing a value of the second threshold such that the value is larger when the vehicle is determined to be in the moving state than when the vehicle is determined to be in the standstill state.

8. The method for controlling a hybrid vehicle according to claim 7, further comprising the step of, when said remaining capacity exceeds said second threshold during the standstill state, setting a vehicle operation mode at an economy running mode in which said internal combustion engine is stopped during the standstill state and is started as the vehicle starts moving.

9. The method for controlling a hybrid vehicle according to claim 7, wherein the step of changing at least one of the start condition and the stop condition includes the step of, when the vehicle is determined to be in the standstill state, changing a value of said first threshold to be smaller than during the moving state.

* * * * *